(12) United States Patent
Robert

(10) Patent No.: US 8,505,445 B2
(45) Date of Patent: Aug. 13, 2013

(54) DEVICE FOR FORMING STUFFED FOOD WITH A PASTRY CASE BY MULTIPLE FOLDING

(76) Inventor: Ou-Young Robert, Chung-Ho (TW)

( * ) Notice: Subject to any disclaimer, the term of this patent is extended or adjusted under 35 U.S.C. 154(b) by 373 days.

(21) Appl. No.: 12/973,828

(22) Filed: Dec. 20, 2010

(65) Prior Publication Data

US 2012/0152130 A1 Jun. 21, 2012

(51) Int. Cl.
*A21C 9/06* (2006.01)
(52) U.S. Cl.
USPC ........ 99/450.7; 99/450.5; 99/450.6; 426/138; 426/502; 426/503
(58) Field of Classification Search
USPC ............ 99/450.1, 450.2, 450.3, 450.4, 450.5, 99/450.6, 450.7, 450.8; 426/138, 275, 496, 426/502, 503, 549, 94
See application file for complete search history.

(56) References Cited

U.S. PATENT DOCUMENTS

| | | | | |
|---|---|---|---|---|
| 4,528,900 A * | 7/1985 | Simelunas | ................... | 99/450.7 |
| 5,814,360 A * | 9/1998 | McDilda et al. | ................ | 426/94 |
| 6,170,391 B1 * | 1/2001 | Pomara, Jr. | .................. | 99/450.6 |
| 6,203,828 B1 * | 3/2001 | Thota et al. | ..................... | 426/76 |
| 6,321,642 B1 * | 11/2001 | Ou-Young | ....................... | 99/494 |
| 7,059,468 B2 * | 6/2006 | Jarvenkyla | ............... | 198/867.01 |
| 2008/0135458 A1 * | 6/2008 | Ou-Young | ..................... | 209/3.2 |
| 2010/0242743 A1 * | 9/2010 | Hashimoto et al. | .......... | 99/450.1 |

* cited by examiner

*Primary Examiner* — Henry Yuen
*Assistant Examiner* — John Wasaff
(74) *Attorney, Agent, or Firm* — Guice Patents PLLC

(57) ABSTRACT

The present invention provides a device for performing multiple folding on a pastry case enclosing a stuffing so as to made stuffed foods with pastry cases, such as Chinese spring rolls and Mexican tacos. The device is characterized in that a stuffing feeder, a pastry case front folding plate, a pastry case front pressing stand, a pastry case two-sided folding plate, a pastry case flanging and pressing stand, and a consecutive folding and pressing stand are disposed on a conveyor belt of an apparatus in sequence, for performing the steps of: upon entry of the pastry case onto the conveyor belt, feeding a stuffing automatically and continuously, and then performing single folding, two-sided folding, and secondary bending-pressing, to thereby form stuffed foods with pastry cases by multiple folding.

6 Claims, 7 Drawing Sheets

DEVICE FOR FORMING STUFFED FOOD WITH A PASTRY CASE BY MULTIPLE FOLDING

FIELD OF THE INVENTION

The present invention relates to devices for forming stuffed food with a pastry case by multiple folding, and more particularly, to a device for forming stuffed food with a pastry case by multiple folding, which entails taking the steps of: upon entry of a pastry case onto a conveyor belt, feeding a stuffing automatically and continuously, and then performing single folding, two-sided folding, and secondary bending-pressing.

BACKGROUND OF THE INVENTION

In general, there are essentially two ways of making stuffed foods. The first category of stuffed foods, such as Chinese steamed buns with stuffing, western-style salad bread, etc., are prepared by putting a stuffing in a dough or bread completely or partially. The second category of stuffed foods, such as rolled pancake with sautéed beef, and spring rolls that originate in northern China, as well as tacos that originate in Mexico, are prepared by taking the following steps: a stuffing is placed on a thin pastry case; and the portions of the pastry case which are not currently covered with the stuffing are folded toward the stuffing.

Stuffed foods of the second category, such as Mexican tacos, are not prepared simply by feeding or squeezing a stuffing into a dough in an irregular manner. In fact, the process of preparing stuffed foods of the second category involves the steps of: placing an appropriate amount of a stuffing at one end of a pastry case; folding inward and transversely the front edge of a portion of the pastry case not covered with the stuffing; folding the two opposing edges of the pastry case inward and transversely by consecutive steps of bending and curling. According to the prior art, it is necessary to keep the stuffing intact and keep the outside of the pastry case tidy and perfect at the end of production process. Hence, the production process of stuffed food with a pastry case is carried out mostly by hands, that is, workers manually feed the stuffing, fold the pastry case, and bend a semi-finished product until a finished product is produced to the full. As a result, the production process is not cost-efficient during an era of high wages.

Although the food processing industry has recently developed a processing device for folding a pastry case, the processing device thus developed has drawbacks, such as complicated structure, intricate procedure, and difficulty in an operation process and a control process. As a result, foods produced by the processing device have drawbacks, namely low yield, unevenness of the foods thus produced, and high production costs. In view of the drawbacks of the prior art, there is still room for improvement on the prior art.

BRIEF SUMMARY OF THE INVENTION

In view of the drawbacks of the conventional method for making stuffed food with a pastry case, the inventor of the present invention has developed and proposed a device for forming stuffed food with a pastry case by multiple folding. The device is characterized in that a stuffing feeder, a pastry case front folding plate, a pastry case front pressing stand, a pastry case two-sided folding plate, a pastry case flanging and pressing stand, and a consecutive folding and pressing stand are disposed on a conveyor belt of an apparatus in sequence, for performing the steps of: upon entry of the pastry case onto the conveyor belt, feeding a stuffing automatically and continuously, and then performing single folding, two-sided folding, and secondary bending-pressing, to thereby form stuffed foods with a pastry case, such as Chinese spring rolls and Mexican tacos, by multiple folding and finalize the stuffed foods with a pastry case F.

An infrared detector is disposed above a conveyor belt, positioned at the front end of an apparatus, and positioned proximate to one side of the pastry case feed-in positioning board. The infrared detector serves to detect and determine whether the pastry case has been timely replenished. Upon a negative determination regarding the replenishment of the pastry case, the infrared detector triggers the suspension of back-end stuffing feeding, folding, pressing, and curling.

In this device, a pressing mechanism is provided to facilitate the operation of single folding, two-sided folding, bending, and curling, so as to efficiently prevent restoration of the original shape of the pastry case due to the resilience characteristic thereof after any portion of the pastry case has been folded or bent during a food processing process.

DETAILED DESCRIPTION OF THE EMBODIMENTS OF THE INVENTION

Figure 1:
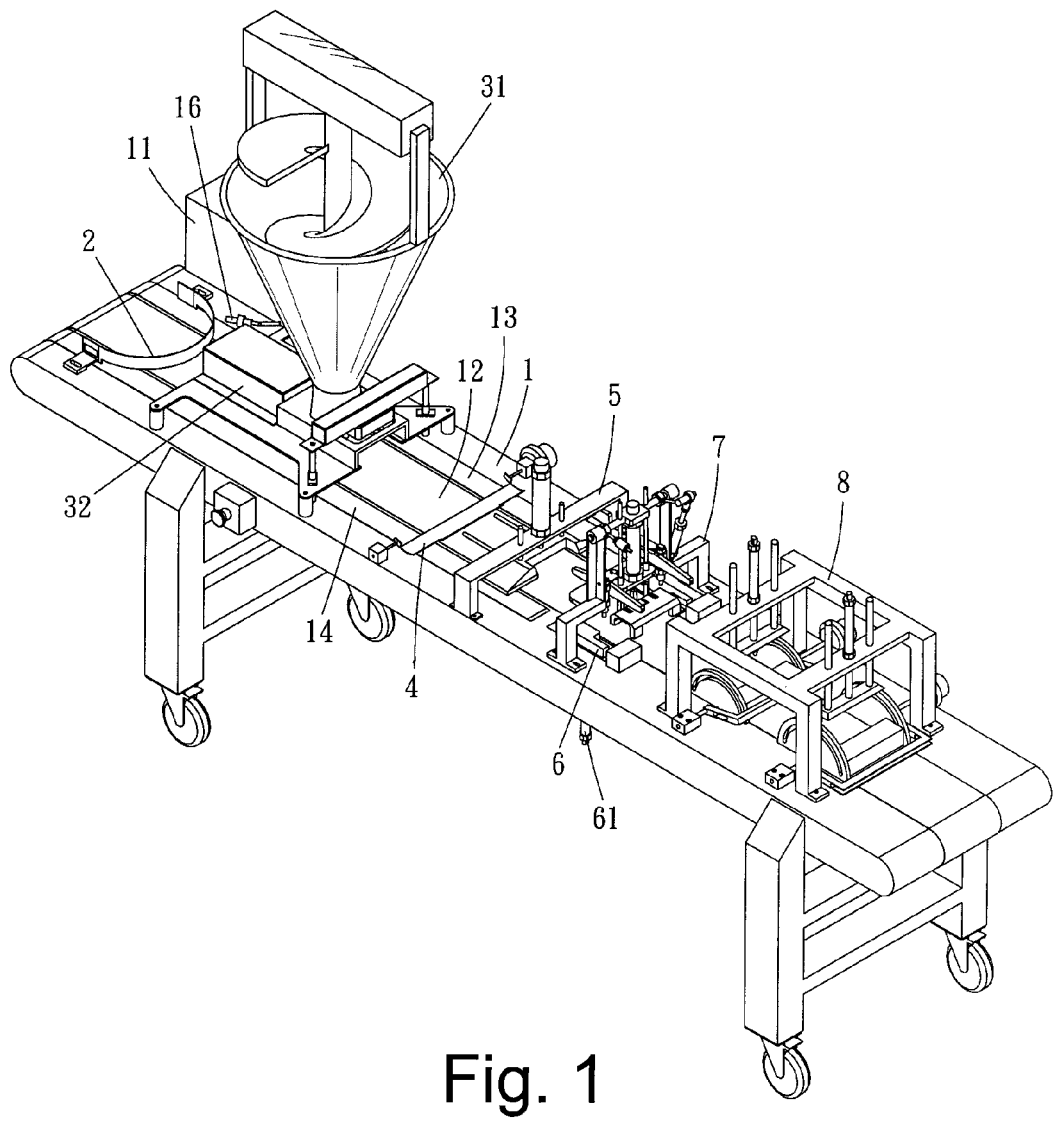
FIG. 1 is a perspective view of a device for forming stuffed food with a pastry case by multiple folding according to the present invention.

Referring to FIG. 1, there is shown a perspective view of a device for forming stuffed food with a pastry case by multiple folding according to the present invention. As shown in FIG. 1, a device for forming stuffed food with a pastry case by multiple folding according to the present invention comprises an apparatus 1 and a conveyor belt 11 thereof. Disposed on the conveyor belt 11 in sequence are a pastry case feed-in positioning board 2, a stuffing feeder 3, a pastry case front folding plate 4, a pastry case front pressing stand 5, a pastry case two-sided folding plate 6, a pastry case front flanging and pressing stand 7, and a consecutive folding and pressing stand 8.

Figure 2:
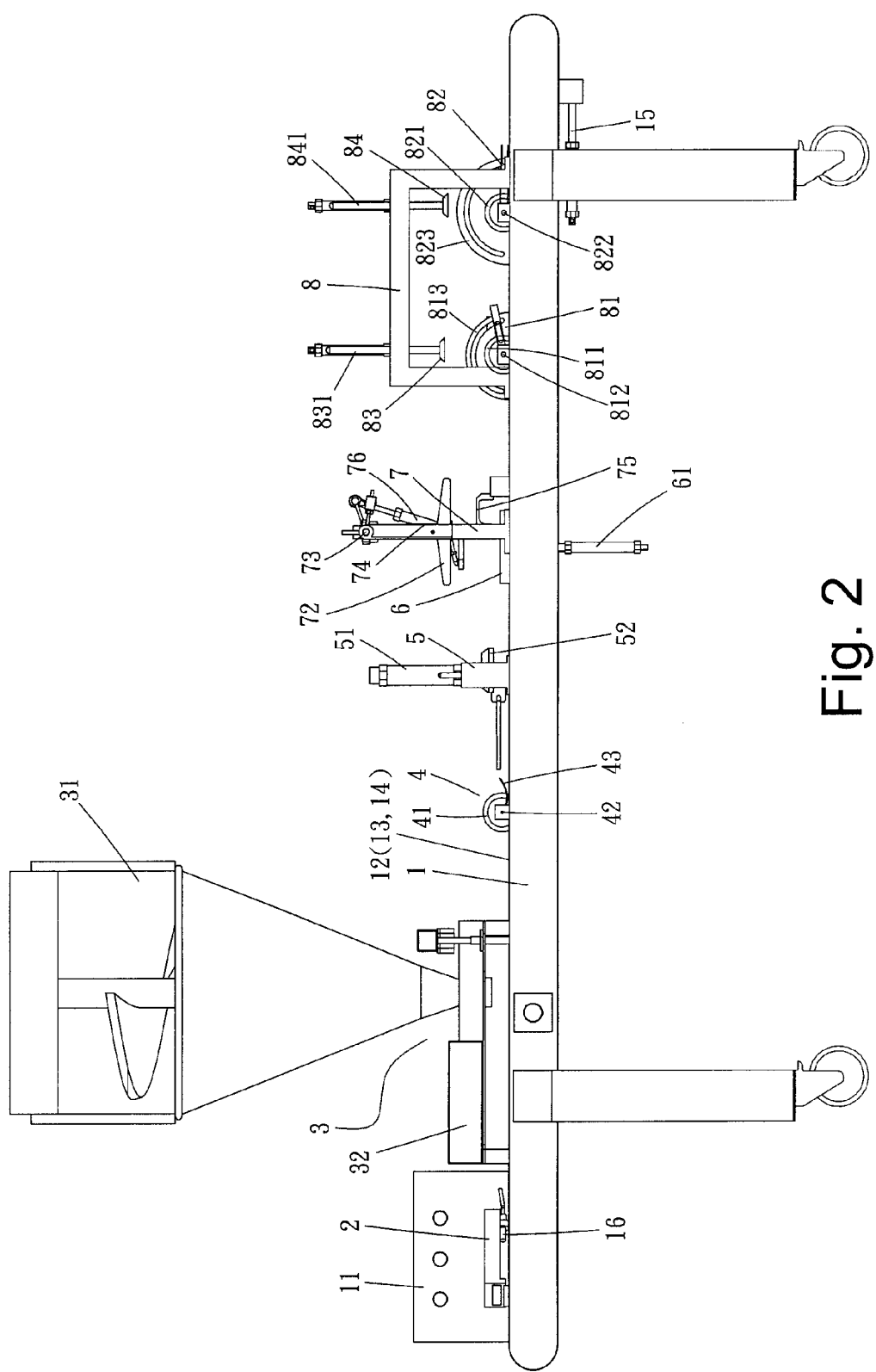
FIG. 2 is a side view of the device for forming stuffed food with a pastry case by multiple folding according to the present invention.
Figure 3:
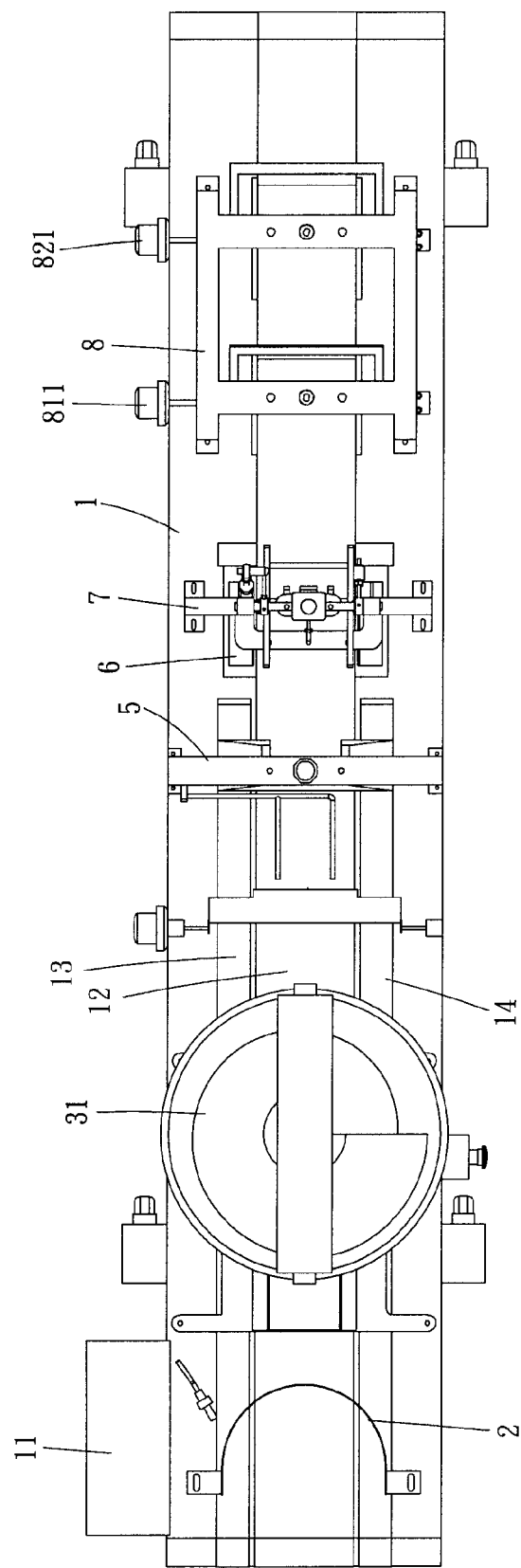
FIG. 3 is a top view of the device for forming stuffed food with a pastry case by multiple folding according to the present invention.
Figure 4:
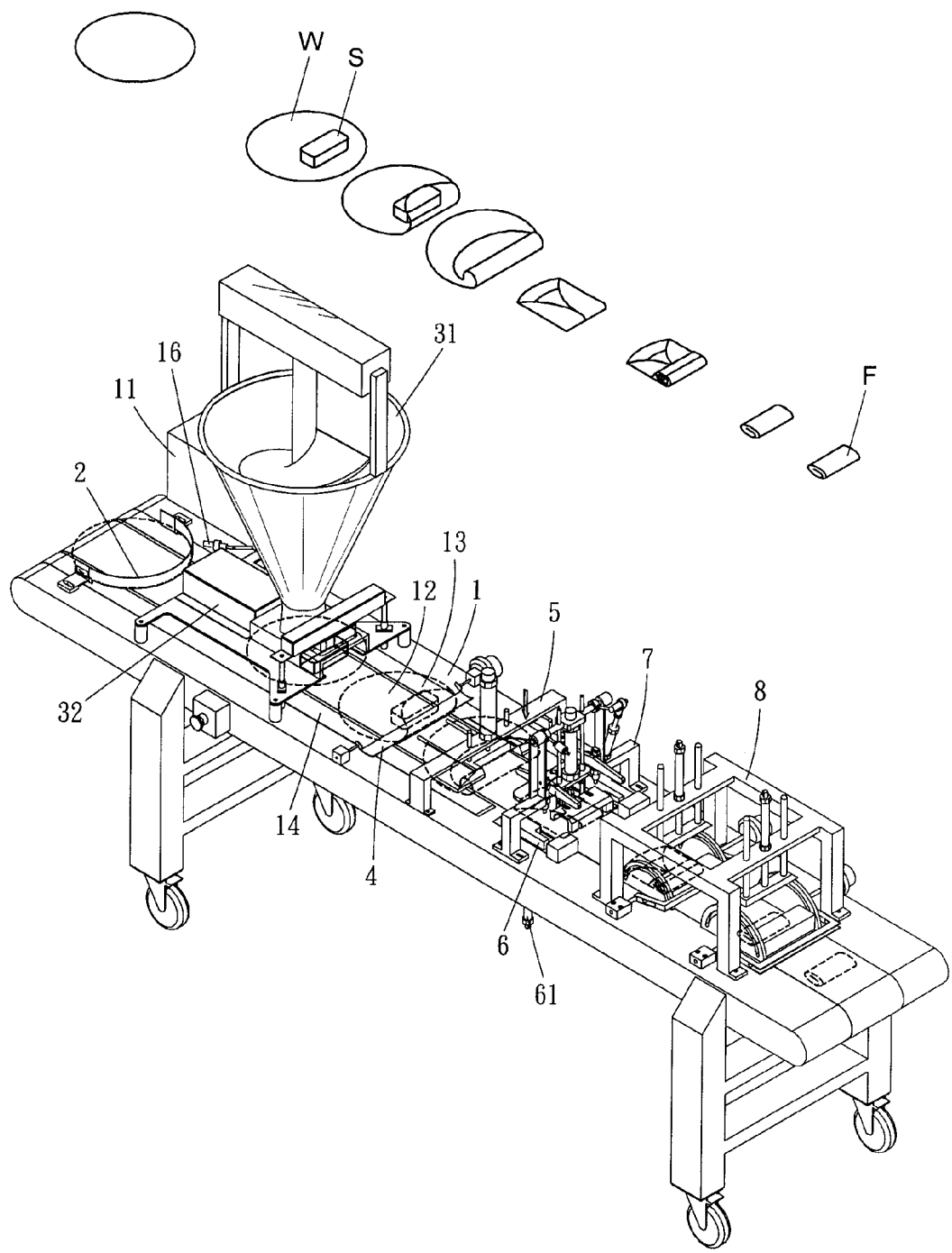
FIG. 4 is a perspective view of the device for forming stuffed food with a pastry case by multiple folding, a pastry case, and a stuffing mass S according to an embodiment of the present invention.

Referring to FIG. 2 through FIG. 4, a control box 11 and a conveyor belt 12 are disposed on an apparatus 1, and the conveyor belt 12 is flanked by two short conveyor belts 13, 14. The conveyor belts 12, 13, 14 are intermittently moved in one direction only, that is, backward, using an actuator 15 driven by a pump or a motor.

The pastry case feed-in positioning board 2 lying above the apparatus 1 is disposed at the front end of the conveyor belt 12 and functions as a positioning board corresponding in shape to a pastry case W. The pastry case feed-in positioning board 2 enables a worker to position the pastry case W (to be processed) on the conveyor belts 12, 13, 14 precisely.

The stuffing feeder 3 is disposed at the conveyor belt 11 at the rear of the pastry case feed-in positioning board 2. The stuffing feeder 3 comprises a stuffing canister 31 and a stuffing quantifying-squeezing disk 32. Once the pastry case W moves to beneath the stuffing feeder 3, the stuffing feeder 3 will timely squeeze out a specific amount of a stuffing mass S, such that the specific amount of the stuffing mass S will fall onto the front edge of the pastry case W.

Figure 5:
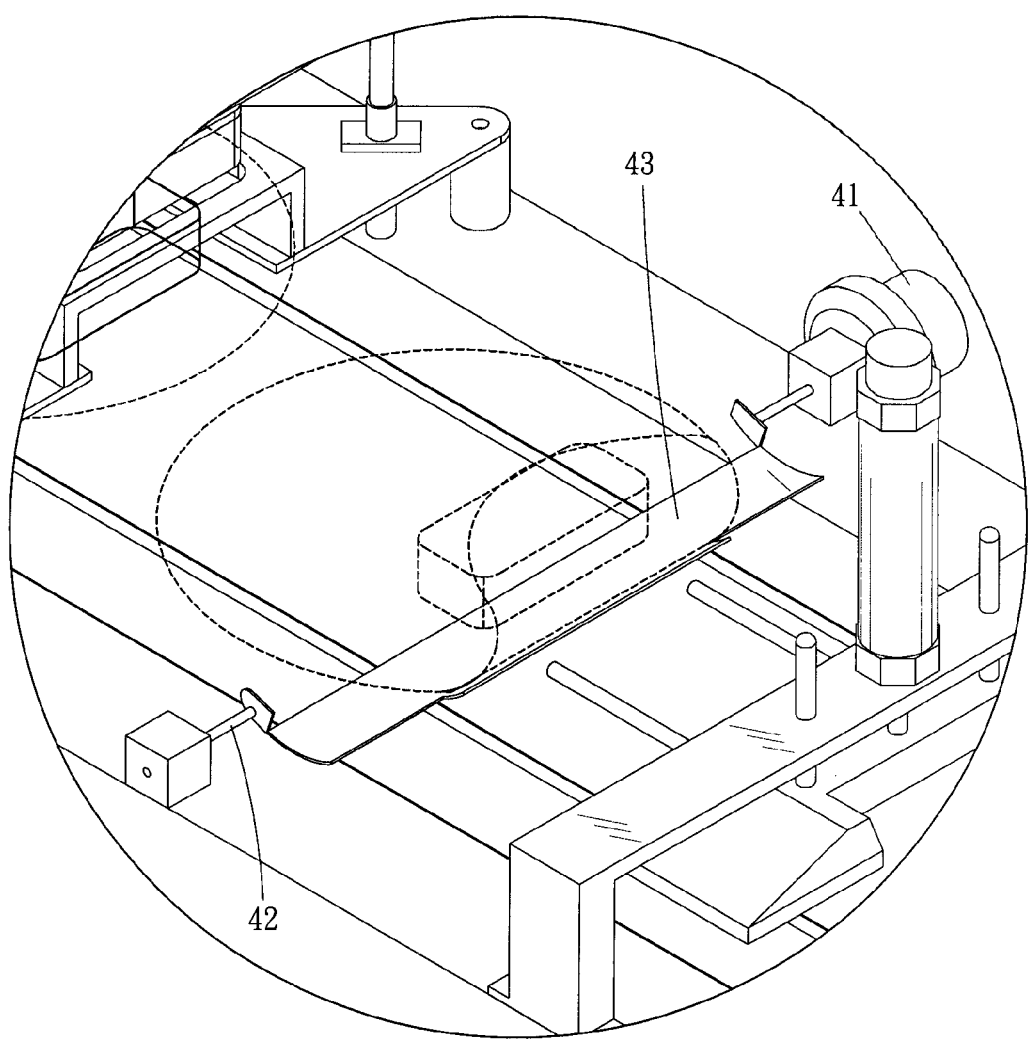
FIG. 5 is an enlarged perspective view of a pastry case front folding plate according to the present invention.

As shown in FIG. 5, the pastry case front folding plate 4 is disposed above the conveyor belt 12 and positioned behind the stuffing feeder 3. The pastry case front folding plate 4 comprises a reciprocating-rotating pump 41, a crank shaft 42, and an arc-shaped board 43. The crank shaft 42 connects the reciprocating-rotating pump 41 and the arc-shaped board 43. After the pastry case W carrying a stuffing mass S thereon has moved to the pastry case front folding plate 4 to allow a front portion of the pastry case W to cover the arc-shaped board 43, the reciprocating-rotating pump 41 starts and drives the arc-shaped board 43 to rotate, and thus the front portion of the pastry case W bends and covers the stuffing mass S.

The pastry case front pressing stand 5 is disposed above the conveyor belt 12 and positioned behind the pastry case front folding plate 4. The pastry case front pressing stand 5 is provided with a pump 51 fixed thereto and connected with a pressing plate 52 which is movable vertically. After the pastry case W having the front portion thereof folded and carrying the stuffing mass S thereon has moved to the pastry case front pressing stand 5, the pressing plate 52 presses downward so as to prevent the folded pastry case W from restoration.

The pastry case two-sided folding plate 6 is disposed above the conveyor belt 12 and positioned behind the pastry case front pressing stand 5. The pastry case two-sided folding plate 6 functions as a two-sided folding mechanism which is bilaterally symmetrical and is driven by a pump 61 to perform centripetal rotation. After the pastry case W having the front portion thereof folded and carrying the stuffing mass S thereon has moved to the pastry case two-sided folding plate 6, the rotatable and bilaterally symmetrical pastry case two-sided folding plate 6 begins to perform centripetal rotation and bend inward the two opposing edges of the pastry case W having the front portion thereof folded and carrying the stuffing mass S thereon to thereby finalize the process of the two-sided folding of the pastry case W.

Figure 6:
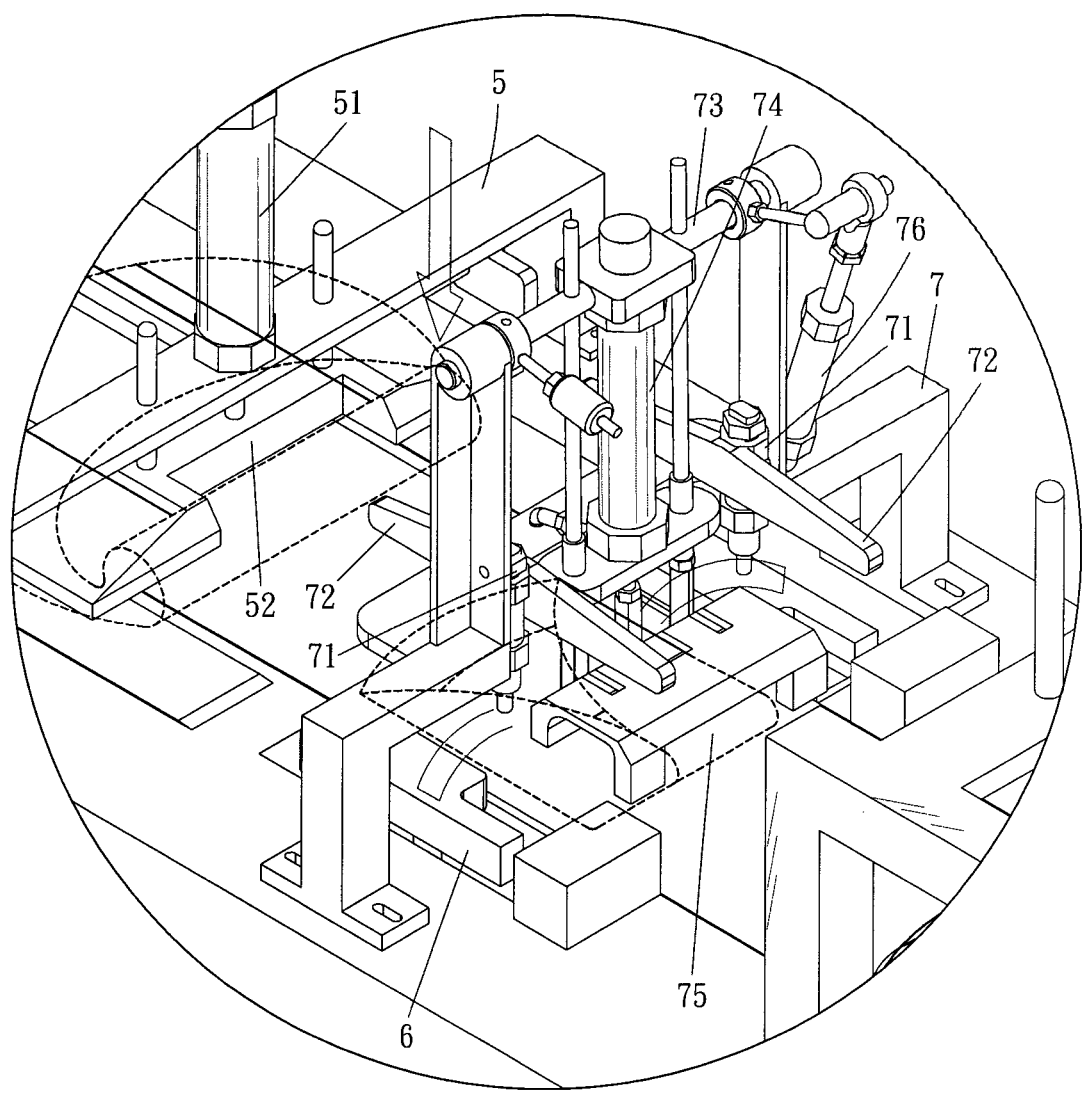
FIG. 6 is an enlarged perspective view of a pastry case two-sided folding plate and a pastry case flanging and pressing stand according to the present invention.

As shown in FIG. 6, the pastry case flanging and pressing stand 7 is disposed above the conveyor belt 12 and positioned above the pastry case two-sided folding plate 6. Two corresponding pumps 71 are disposed on two inner sides of the pastry case flanging and pressing stand 7, respectively. The pumps 71 each have one end connected to a flanging plate 72. A rotary axle 73 is disposed above the pastry case flanging and pressing stand 7. The rotary axle 73 is provided with a pump 74 perpendicular thereto and connected to a pressing plate 75. Furthermore, the rotary axle 73 is connected to a rotary pump 76.

Prior to the process of the two-sided folding of the pastry case W carrying the stuffing mass S thereon, the pumps 71 drive the bilaterally symmetrical flanging plate 72 to press downward so as to serve two purposes: shaping the folded front portion of the pastry case W and the stuffing mass S; and forming a folding line on two opposing edges of the pastry case W by pressing.

After the process of the two-sided folding of the pastry case W carrying the stuffing mass S thereon, the pump 74 drives the pressing plate 75 to press downward so as to serve two purposes: shaping the stuffing mass S; and pressing the two folded margins of the pastry case W to prevent the restoration of the two-sided folded pastry case W. Also, after the rotary pump 76 connected to the rotary axle 73 has started, the rotary axle 73, the pump 74 and the pressing plate 75 rotate backward and concurrently, such that the pressing plate 75 presses against the pastry case W having the front and lateral portions thereof folded and carrying the stuffing mass S thereon to thereby cause the pastry case W to move backward along the conveyor belt 11.

Figure 7:
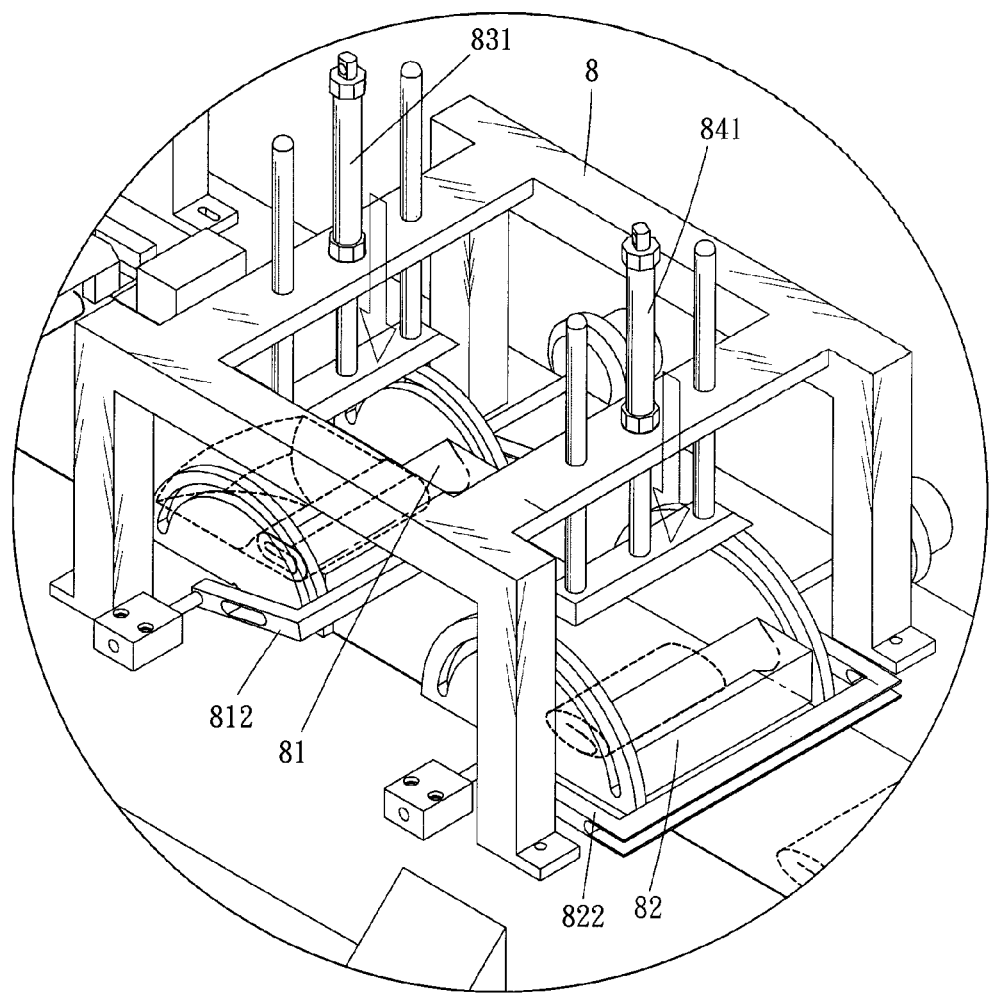
FIG. 7 is an enlarged perspective view of a consecutive folding and pressing stand according to the present invention.

As shown in FIG. 7, the consecutive folding and pressing stand 8 is disposed above the conveyor belt 12 and positioned behind the pastry case flanging and pressing stand 7. The consecutive folding and pressing stand 8 comprises a primary bending turner 81, a secondary bending turner 82, a primary pressing plate 83, and a secondary pressing plate 84. Due to the reciprocative rotation of pumps 811, 821, deflecting bars 812, 822 are connected to the primary bending turner 81 and the secondary bending turner 82. The deflecting bars 812, 822 are engaged with arc-shaped boards 813, 823, so as to lift and bend in two consecutive instances the pastry case W having the front and lateral portions thereof folded and carrying the stuffing mass S thereon.

The primary pressing plate 83 and the secondary pressing plate 84, which are connected by pumps 831, 841, are disposed above the consecutive folding and pressing stand 8 and correspond in position to the primary bending turner 81 and the secondary bending turner 82, respectively, such that, upon its bending, the pastry case W (a semi-finished product) which has undergone a folding process twice, has had two lateral portions thereof folded, and is presently carrying the stuffing mass S thereon is pressed by the lowering primary and secondary pressing plates 83, 84. In so doing, the device for forming stuffed food with a pastry case by multiple folding according to the present invention is capable of feeding the stuffing automatically and continuously, and then performing single folding, two-sided folding, and secondary bending-pressing, to thereby form stuffed food with a pastry case by multiple folding and finalize the stuffed food with a pastry case F.

An infrared detector 16 is disposed above the conveyor belt 12, positioned at the front end of the apparatus, and positioned proximate to one side of the pastry case feed-in positioning board 2. The infrared detector 16 serves to detect and determine whether the pastry case W which should be disposed on the pastry case feed-in positioning board 2 has been timely replenished. Upon a negative determination regarding the replenishment of the pastry case W, the infrared detector 16 triggers the suspension of back-end stuffing feeding, folding, pressing, and curling.

An air compressor supplies compressed air to the actuator 15 (when operating as a pump), the stuffing quantifying-squeezing disk 32, the reciprocating-rotating pump 41 of the pastry case front folding plate 4, the pump 51 of the pastry case front pressing stand 5, the pump 61 of the pastry case two-sided folding plate 6, the pumps 71 of the pastry case flanging and pressing stand 7, the reciprocatively rotating pumps 811, 821 of the primary bending turner 81 and the secondary bending turner 82 of the consecutive folding and pressing stand 8, and the pumps 831, 841 of the primary pressing plate 83 and the secondary pressing plate 84 of the consecutive folding and pressing stand 8. The pumps and a circuit of the infrared detector are electrically connected to a control program and a control circuit in a cabinet 11 for controlling the start and shutdown of the pumps and the infrared detector 16.

What is claimed is:

1. A device for forming stuffed food with a pastry case by multiple folding, comprising:
    an apparatus (1) having thereon a control box (11) and a conveyor belt (12), the conveyor belt (12) being flanked by two short conveyor belts (13, 14), wherein the conveyor belts (12, 13, 14) are intermittently moved in one direction only, that is, backward, using an actuator (15) driven by a pump or a motor;
    wherein disposed above the conveyor belt (12) of the apparatus (1) in sequence are:
    a pastry case feed-in positioning board (2) lying above the apparatus (1), being disposed at the front end of the conveyor belt (12), and functioning as a positioning board (2) corresponding in shape to a pastry case (W), such that the pastry case feed-in positioning board (2) enables a worker to position the pastry case (W) on the conveyor belts (12, 13, 14) precisely;
    a stuffing feeder (3) disposed at the conveyor belt (11) at the rear of the pastry case feed-in positioning board (2), the stuffing feeder (3) comprising a stuffing canister (31) and a stuffing quantifying-squeezing disk (32), wherein, once the pastry case (W) moves to beneath the stuffing feeder (3), the stuffing feeder (3) will timely squeeze out a specific amount of a stuffing mass (S), such that the specific amount of the stuffing mass (S) will fall onto the front edge of the pastry case (W);
    a pastry case front folding plate (4) disposed above the conveyor belt (12) and positioned behind the stuffing feeder (3), the pastry case front folding plate (4) comprising a reciprocating-rotating pump (41), a crank shaft (42), and an arc-shaped board (43), the crank shaft (42) connecting the reciprocating-rotating pump (41) and the arc-shaped board (43), wherein, after the pastry case (W) carrying a stuffing mass (S) thereon has moved to the pastry case front folding plate (4) to allow a front portion of the pastry case (W) to cover the arc-shaped board (43), the reciprocating-rotating pump (41) starts and drives the arc-shaped board (43) to rotate, such that the front portion of the pastry case (W) bends and covers the stuffing mass (S);
    a pastry case front pressing stand (5) disposed above the conveyor belt (12) and positioned behind the pastry case front folding plate (4), the pastry case front pressing stand (5) being provided with a pump (51) fixed thereto and connected with a vertically movable pressing plate (52), wherein, after the pastry case (W) having the front portion thereof folded and carrying the stuffing mass (S) thereon has moved to the pastry case front pressing stand (5), the pressing plate (52) presses downward so as to prevent the folded pastry case (W) from restoration;
    a pastry case two-sided folding plate (6) disposed above the conveyor belt (12) and positioned behind the pastry case front pressing stand (5), the pastry case two-sided folding plate (6) functioning as a two-sided folding mechanism which is bilaterally symmetrical and is driven by a pump (61) to perform centripetal rotation, wherein, after the pastry case (W) having the front portion thereof folded and carrying the stuffing mass (S) thereon has moved to the pastry case two-sided folding plate (6), the rotatable and bilaterally symmetrical pastry case two-sided folding plate (6) begins to perform centripetal rotation and bend inward the two opposing edges of the pastry case (W) having the front portion thereof folded and carrying the stuffing mass (S) thereon to thereby finalize the process of the two-sided folding of the pastry case (W);
    a pastry case flanging and pressing stand (7) disposed above the conveyor belt (12) and positioned above the pastry case two-sided folding plate (6), wherein two corresponding pumps (71) are disposed on two inner sides of the pastry case flanging and pressing stand (7), respectively, wherein the pumps (71) each have one end connected to a flanging plate (72), wherein a rotary axle (73) is disposed above the pastry case flanging and pressing stand (7), provided with a pump (74) perpendicular thereto, and connected to a pressing plate (75), wherein the rotary axle (73) is connected to a rotary pump (76);
    a consecutive folding and pressing stand (8) disposed above the conveyor belt (12) and positioned behind the pastry case flanging and pressing stand (7), the consecutive folding and pressing stand (8) comprising a primary bending turner (81), a secondary bending turner (82), a primary pressing plate (83), and a secondary pressing plate (84), wherein, due to reciprocative rotation of pumps (811, 821), deflecting bars (812, 822) are connected to the primary bending turner (81) and the secondary bending turner (82), wherein the deflecting bars (812, 822) are engaged with arc-shaped boards (813, 823), so as to lift and bend in two consecutive instances the pastry case (W) having the front and lateral portions thereof folded and carrying the stuffing mass (S) thereon; wherein primary pressing plate (83) and the secondary pressing plate (84), which are connected by pumps (831, 841), are disposed above the consecutive folding and pressing stand (8) and correspond in position to the primary bending turner (81) and the secondary bending turner (82), respectively, such that, upon its bending, the pastry case (W) (a semi-finished product) which has undergone a folding process twice, has had two lateral portions thereof folded, and is presently carrying the stuffing mass (S) thereon is pressed by the lowering primary and secondary pressing plates (83, 84), and thus the device is capable of feeding the stuffing automatically and continuously, and then performing single folding, two-sided folding, and secondary bending-pressing, to thereby form stuffed food with a pastry case by multiple folding and finalize the stuffed food with a pastry case (F).

2. The device of claim 1, wherein, prior to the process of the two-sided folding of the pastry case (W) carrying the stuffing mass (S) thereon, the bilaterally symmetrical flanging plate (72) disposed on two inner sides of the pastry case flanging and pressing stand (7) is driven by the pumps (71) to press downward so as to serve two purposes: shaping the folded front portion of the pastry case (W) and the stuffing mass (S); and forming a folding line on two opposing edges of the pastry case (W) by pressing.

3. The device of claim 1, wherein, after the process of the two-sided folding of the pastry case (W) carrying the stuffing mass (S) thereon, the pump (74) drives the pressing plate (75) of the pastry case flanging and pressing stand (7) to press downward so as to serve two purposes: shaping the stuffing mass (S); and
    pressing the two folded margins of the pastry case (W) to prevent the restoration of the two-sided folded pastry case (W).

4. The device of claim 1, wherein, after the rotary pump (76) connected to the rotary axle (73) of the pastry case flanging and pressing stand (7) has started, the rotary axle (73), the pump (74) and the pressing plate (75) rotate backward and concurrently, such that the pressing plate (75) presses against the pastry case (W) having the front and lateral portions thereof folded and carrying the stuffing mass (S) thereon to thereby cause the pastry case (W) to move backward along the conveyor belt (11).

5. The device of claim 1, wherein an infrared detector (16) is disposed above the conveyor belt (12) and positioned at the front end of the apparatus, the infrared detector (16) serving to detect and determine whether the pastry case (W) which should be disposed on the pastry case feed-in positioning board (2) has been timely replenished, such that, upon a negative determination regarding replenishment of the pastry case (W), the infrared detector (16) triggers the suspension of back-end stuffing feeding, folding, pressing, and curling.

6. The device of claim 1, wherein an air compressor supplies compressed air to the actuator (15), the stuffing quantifying-squeezing disk (32), the reciprocating-rotating pump (41) of the pastry case front folding plate (4), the pump (51) of the pastry case front pressing stand (5), the pump (61) of the pastry case two-sided folding plate (6), the pumps (71) of the pastry case flanging and pressing stand (7), the reciprocatively rotating pumps (811, 821) of the primary bending turner (81) and the secondary bending turner (82) of the consecutive folding and pressing stand (8), and the pumps (831, 841) of the primary pressing plate (83) and the secondary pressing plate (84) of the consecutive folding and pressing stand (8), wherein the pumps and a circuit of the infrared detector (16) are electrically connected to a control program and a control circuit in a cabinet (11) for controlling the start and shutdown of the pumps and the infrared detector.

\* \* \* \* \*